Figure 1:
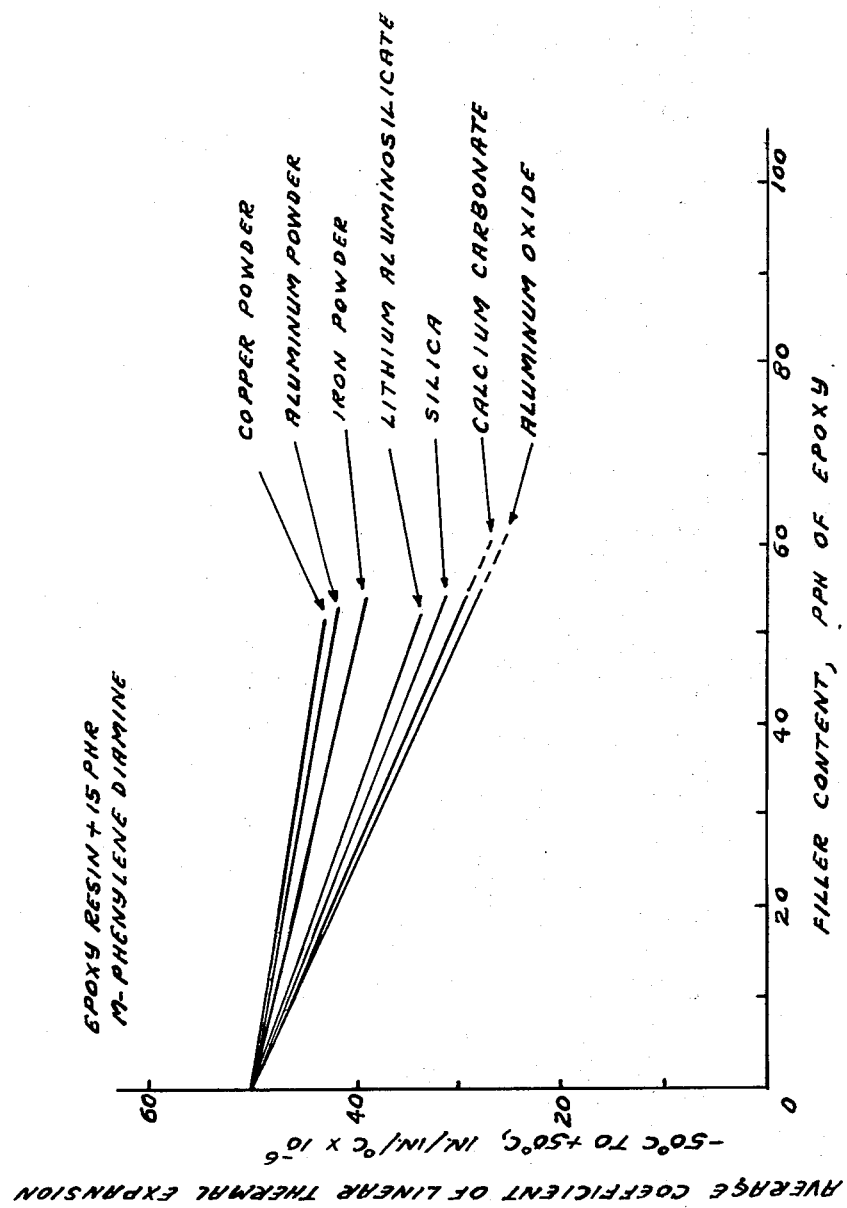

United States Patent [19]

Dauksys

[11] 3,908,040
[45] Sept. 23, 1975

[54] METHOD OF ENCAPSULATION

[75] Inventor: Richard J. Dauksys, Bellbrook, Ohio

[73] Assignee: The United States of America as represented by the Secretary of the Air Force, Washington, D.C.

[22] Filed: Jan. 7, 1974

[21] Appl. No.: 431,198

[52] U.S. Cl. ............... 427/58; 260/37 EP; 427/162; 427/386; 428/413
[51] Int. Cl.$^2$ .................. C09D 3/58; H01B 3/40
[58] Field of Search... 260/37 EP; 117/232, 161 ZB, 117/132 BE; 427/162, 386; 428/413

[56] References Cited
UNITED STATES PATENTS

| | | | |
|---|---|---|---|
| 3,310,527 | 3/1967 | DeAcetis et al. | 117/161 ZB |
| 3,344,096 | 9/1967 | Manasia et al. | 117/128.4 X |
| 3,658,750 | 4/1972 | Tsukui et al. | 260/37 EP |
| 3,679,465 | 7/1972 | Flynn | 117/126 GE |
| 3,686,139 | 8/1972 | Lubin | 260/37 EP |
| 3,689,444 | 9/1972 | Wolfe | 117/161 ZB |
| 3,806,489 | 4/1974 | Rieux et al. | 260/37 EP |

Primary Examiner—Harry J. Gwinnell
Attorney, Agent, or Firm—Joseph E. Rusz; Cedric H. Kuhn

[57] ABSTRACT

A method of encapsulation is provided that comprises covering the article to be encapsulated with an epoxy resin containing discontinuous graphite and/or boron nitride fibers, and curing the epoxy resin, thereby obtaining a product having a low coefficient of linear thermal expansion. The method is particularly useful for encapsulating delicate electrical, optical and mechanical elements that are incapable of withstanding thermal stresses.

6 Claims, 2 Drawing Figures

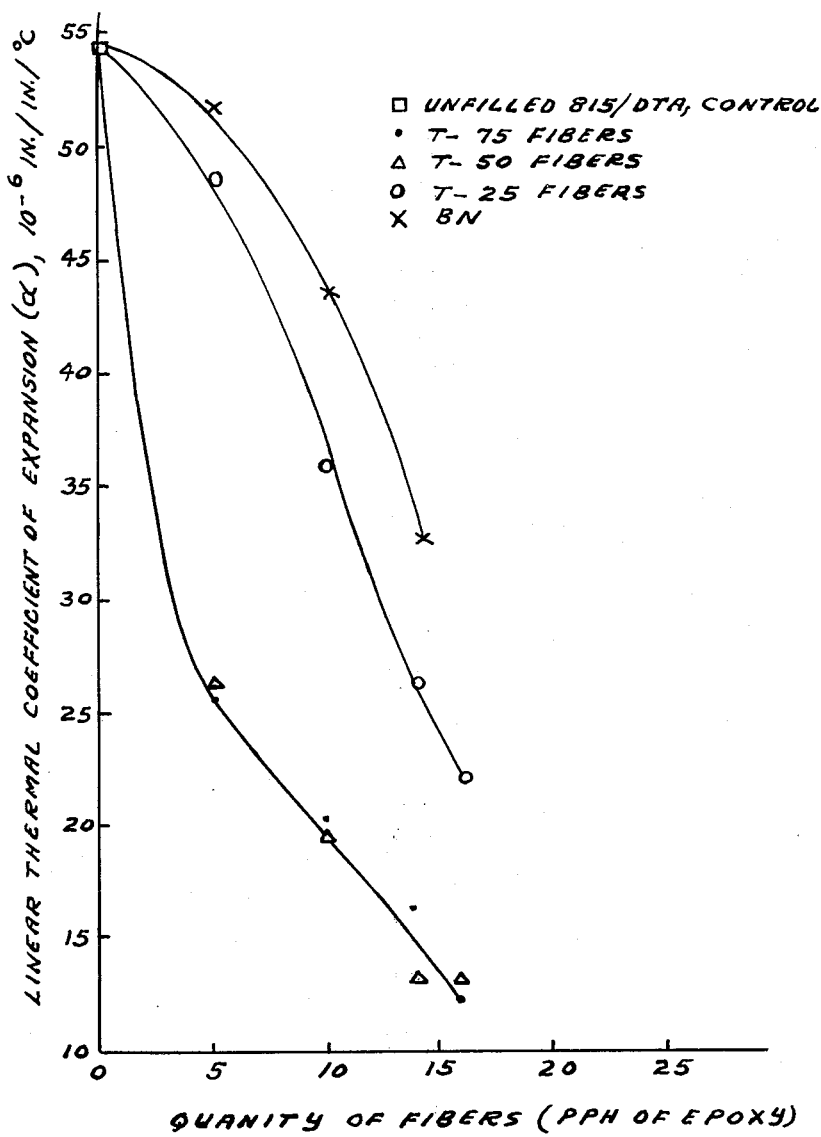
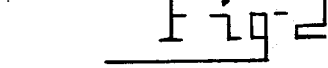

METHOD OF ENCAPSULATION

RIGHTS OF THE GOVERNMENT

The invention described herein may be manufactured and used by or for the Government of the United States for all governmental purposes without the payment of any royalty.

FIELD OF THE INVENTION

This invention is concerned with a method for encapsulating elements that may be subjected to thermal stresses. In one aspect it relates to a potting composition having a low coefficient of thermal expansion.

BACKGROUND OF THE INVENTION

A variety of resins, e.g., silicones, fluorocarbons, polyurethanes and epoxies, are employed to encapsulate electrical, optical and mechanical components. Of the various resins, the epoxies are the ones that are most extensively used. However, epoxy resins have not proven to be completely satisfactory when epoxy-potted components, which are structurally delicate, are exposed to thermally induced compressive forces. Because the coefficient of linear thermal expansion of conventional epoxy potting compositions is relatively high, delicate components, such as sensors, may be rendered inoperative by expansion of the compositions upon exposure to such conditions.

It is an object of this invention, therefore, to provide an epoxy potting composition which has a low coefficient of thermal expansion.

Another object of the invention is to provide a method of encapsulation that is particularly adapted for encapsulating delicate components.

Other objects and advantages of the invention will become apparent to those skilled in the art upon consideration of the accompanying disclosure and the drawing, in which:

FIG. 1 illustrates graphically the effect of fillers on coefficient of linear thermal expansion; and FIG. 2 illustrates graphically the effect of discontinuous graphite and boron nitride fibers on coefficient of linear thermal expansion.

SUMMARY OF THE INVENTION

Broadly speaking, the present invention resides in a method for encapsulating components which comprises covering desired portions of the components with a composition consisting essentially of a mixture of an epoxy resin, specific amounts of chopped graphite and/or boron nitride fibers, and a curing agent; and curing the composition so as to form a solid epoxy resin covering the portions of the components. In another embodiment the invention lies in the composition which is utilized in the encapsulation method. It has been discovered that the composition possesses a very low coefficient of linear thermal expansion, a property which renders it particularly suitable for use as a potting composition for delicate components.

Any of the well known epoxy resins can be utilized in the practice of the present invention so long as they are pourable, or can be rendered pourable, at about room temperature. Thus, a resin having a viscosity such that it is too thick to pour can be made to pour readily by the addition of a monofunctional epoxy diluent, such as butyl glycidyl ether. In general, the epoxy resins contain more than one epoxy group, i.e., a cyclic ether group in which an ether oxygen atom is attached to two adjacent carbon atoms. Epoxy resins that are preferred are those obtained by reacting a polyhydric phenol with a polyfunctional halohydrin. Exemplary polyhydric phenols include resorcinol and various bisphenols derived from the condensation of phenol with aldehydes and ketones such as formaldehyde, acetaldehyde, acetone, methyl ethyl ketone, and the like. A particularly preferred epoxy resin of this class of resins is the condensation product of epichlorohydrin and bisphenol A [2,2-bis(p-hydroxyphenyl)propane]. This resin has the following structural formula:

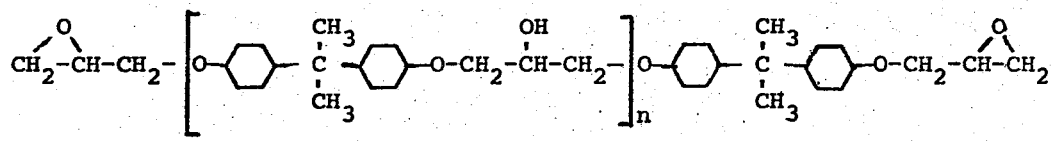

wherein $n$ has a value such that the resin is liquid at room temperature. Generally $n$ is equal to zero or to an integer from 1 to 4, inclusive. Commercially available liquid diglycidyl ethers of bisphenol A according to the above formula are Epon 815, 820, 826, 828 and 830 resins of Shell Chemical Company. Certain properties of these resins are shown below in the table.

| Resin | Melting Point, °C | Viscosity, poises at 25°C | Epoxide[1] Equivalent |
|---|---|---|---|
| Epon 815 | Liquid | 5–7 | 175–195 |
| Epon 820 | Liquid | 40–100 | 180–195 |
| Epon 826 | Liquid | 65–95 | 180–188 |
| Epon 828 | Liquid | 100–160 | 185–192 |
| Epon 830 | Liquid | 150–225 | 190–210 |

[1] Grams of resin containing one gram-equivalent of epoxide.

The graphite and/or boron nitride fibers used in the practice of the present invention are available from commercial sources. The as-received fibers are chopped or cut to a length, e.g., 0.25 to 0.75 inch, suitable for blending with the epoxy resin. In the blending operation in which a high speed blender having cutting blades is utilized the fiber segments are further chopped to provide discontinuous fibers having an average length in the range of about 1 to 10 mils, preferably about 3 mils. The amount of fibers blended with the epoxy resin generally falls in the range of about 5 to 20, preferably 10 to 16, parts by weight per 100 parts by weight of the resin.

The conventional curing agents for polyepoxides can be employed in curing or crosslinking the epoxy resins used in practicing the present invention. Amines, such as aromatic and aliphatic primary, secondary and tertiary amines, have been found to be especially suitable. Examples of such curing agents include p-phenylenediamine, ethylenediamine, triethylenetetraamine, diethylenetriamine, diethylaminopropylamine, methylene dianiline, diaminodiphenyl sulfone, and the like. Anhydrides of carboxylic acid are also suitable for use as curing agents. Examples of this class of compounds include adipic, maleic, phthalic, dodecenylsuccinic, and trimellitic anhydrides. It is usually preferred to employ curing agents which are liquid at room temperature. The amount of curing agent employed is that which is sufficient to cause the epoxy group to undergo a crosslinking reaction and provide a solid composition. Generally the amount of curing agent utilized falls in the range of about 5 to 15 parts by weight per 100 parts by weight of the epoxy resin. Curing of the epoxy resin composition is preferably conducted at room temperature for a period of about 18 to 48 hours. However, higher temperatures can be employed, e.g., from about room temperature to 100°C, in which case shorter curing times can be used.

A better understanding of the invention can be obtained by referring to the following illustrative examples which are not intended, however, to be unduly limitative of the invention.

EXAMPLE I

A series of runs was conducted in which the potting compositions of this invention were prepared and certain properties of the cured compositions were determined. The epoxy resin utilized was Epon 815 which, as received from the supplier, contained 11 percent of a monofunctional epoxy diluent (butyl glycidyl ether). The discontinuous graphite fibers were obtained from Thornel continuous graphite yarns sold by Union Carbide Corp. The boron nitride fibers, which were supplied in mat form, were obtained from the Carborundum Corp. Properties of the components used in preparing the potting compositions are shown below in Table I.

In preparing the cured potting composition, the procedure described hereinafter was followed in each of the runs. The apparatus used for mixing the resin and chopped fibers was a Waring blender having four cutting blades. The continuous yarns and the BN fibers were cut with scissors to about ½ inch segments and then transferred to a container. The resin in the amount of 100 grams was poured into the blender after which the fiber segments were added. It was found that optimum mixing was obtained by adding the fiber segments in increments of 5 pph of resin.

Mixing of the resin and fibers was conducted for a period of time sufficient to provide a homogeneous blend. The actual mixing time ranged from about 10 to 25 seconds. Initially, the mixing caused cavitation and some fibers were deposited on the sides of the blender above the resin level. The mixing was then terminated after which the fibers were scraped from the sides and deposited in the resin. When a homogeneous mixture was formed, the mixture no longer cavitated and the blender had a smooth mixing sound.

During the blending operation, the mixture increased in temperature as a result of heat transfer from the motor assembly to the mixture. The mixture was allowed to cool to room temperature while under a vacuum to remove entrapped air. After the mixture had cooled to room temperature, 11 pph of diethylenetriamine, the curing agent, was added to the blend. The compositions so prepared were cured at room temperature for a minimum of 16 hours prior to mechanical and physical testing. A control run was also carried out in which the same resin and curing agent were used but no fibers were added. The results of the tests are set forth below in Table II which also shows the amount of fibers contained in the compositions. As seen from the data in the table, the compositions had a coefficient of linear thermal expansion in the range of about $12\times10^{-6}$ to $35\times10^{-6}$ in/in/°C when the compositions contained an amount of fibers ranging from about 10 to 16 pph.

TABLE I

| Property | Thornel 25 | Thornel 50 | Thornel 75 | BN | Epon[1] 815 |
|---|---|---|---|---|---|
| Tensile Modulus, $10^6$ psi | 25 | 50 | 75 | 4–6 | .46 |
| Tensile Strength, $10^3$ psi | 180 | 320 | 375 | 50–100 | 15.7 |
| Density, g/cc | 1.42 | 1.68 | 1.85 | 1.8–2.0 | 1.16 |
| Coeff. of Linear Thermal Exp. $10^{-6}$ in/in/°C | –.445 | –.800 | –.733 | $-2.9\times10^{-6}$[2] | 54.3 |
| Yarn Construction | | | | | |
| Plies | 2 | 2 | 2 | Supplied | — |
| Filaments/ply | 720 | 720 | 720 | in | — |
| Twist/inch | 1.5 | 1.5 | 1.5 | mat form | — |

[1]Cured resin obtained by mixing with 11 pph (parts per hundred by weight) of diethylenetriamine (DTA) and curing at room temperature.
[2]Determined from X-ray analysis of single crystals as reported by Niedenzer and Dawson, Boron-Nitrogen Compounds, U.S. Army Research Office, Duke University, Academic Press Inc., New York (1965).

TABLE II

| Fiber[1] | PPH | Density[2] g/cc | $\alpha$[3] $10^{-6}$ in/in/°C | Modulus[4] $10^{-6}$ psi | Strength[4] $10^{-3}$ psi | Resistivity[5] ohm/cm |
|---|---|---|---|---|---|---|
| Control | 0 | 1.16 | 54.3 | .46 | 15.7 | $8.7 \times 10^{14}$ |
| Thornel 25 | 5 | 1.17 | 48.6 | .45 | 8.5 | — |
| Thornel 25 | 10 | 1.01 | 35.8 | .61 | 11.3 | — |
| Thornel 25 | 14 | 1.44 | 26.4 | .78 | 12.6 | — |
| Thornel 25 | 16 | 1.19 | 26.9 | .69 | 13.7 | — |
| Thornel 50 | 5 | 1.19 | 26.3 | .42 | 12.9 | $6.7 \times 10^8$ |
| Thornel 50 | 10 | 1.19 | 19.7 | .53 | 11.4 | $11.4 \times 10^9$ |
| Thornel 50 | 14 | 1.18 | 13.4 | .65 | 13.8 | $18.9 \times 10^9$ |
| Thornel 50 | 16 | 1.18 | 13.4 | .60 | 12.6 | $7.6 \times 10^8$ |
| Thornel 75 | 5 | 1.19 | 25.5 | .54 | 12.1 | $1.14 \times 10^{10}$ |
| Thornel 75 | 10 | 1.22 | 19.9 | .90 | 12.9 | $1.14 \times 10^9$ |
| Thornel 75 | 14 | — | 16.4 | 1.13 | 15.3 | $1.18 \times 10^9$ |
| Thornel 75 | 16 | 1.23 | 12.3 | 1.28 | 16.3 | $4.9 \times 10^6$ |
| BN | 5 | 1.18 | 51.7 | .39 | 13.0 | $4.93 \times 10^{14}$ |
| BN | 10 | 1.20 | 43.7 | .39 | 8.9 | $3.00 \times 10^{15}$ |
| BN | 14 | 1.21 | 32.8 | .44 | 13.1 | $6.9 \times 10^{13}$ |
| BN/Thornel 75 | 5/10 | 1.20 | 18.4 | .92 | 19.0 | $9.13 \times 10^8$ |

TABLE II-continued

| Fiber[1] | PPH | Density[2] g/cc | $\alpha^{[3]}$ $10^{-6}$ in/in/°C | Modulus[4] $10^{-6}$ psi | Strength,[4] $10^{-3}$ psi | Resistivity[5] ohm/cm |
|---|---|---|---|---|---|---|
| BN/Thornel 75 | 10/5 | 1.19 | 28.8 | .84 | 13.6 | $1.07 \times 10^7$ |

[1]Fiber lengths were measured from 250x photographs of the cured potting compounds. The average length of fibers for all compositions was about 0.003 inch as indicated from sample determinations.
[2]Density was determined by water immersion.
[3]The method and apparatus for determining the coefficient of linear thermal expansion ($\alpha$) were similar to those described in ASTM D-696-70. The specimens used were rectangular in cross section, having overall dimensions of 2.0'' × 0.375'' × 0.250''. The coefficient for the compositions was determined from $-30 \pm 2°C$ to $+30 \pm 2°C$. A minimum of 2 tests was conducted for each value of $\alpha$ shown in the table.
[4]Flexural strength and modulus were obtained from the same specimens that were used for determining the coefficients of thermal expansion. The tests were conducted using procedures of Federal Test Specification L-P406b as a guide. The 3-point loading method was employed with a span to depth ratio of 16 to 1. Specimens were tested at a crosshead rate of 0.05 in/min.
[5]Resistivity measurements were made with a Beckman Megohmmeter, Model L-8, following the procedure outlined in ASTM D-257-66. Specimens were 3'' in diameter and 0.125'' thick.

EXAMPLE II

Two runs are carried out in which identical sensors are encapsulated with an epoxy resin composition. The first sensor is covered with Epon 815 resin containing 11 pph of DTA while the second sensor is covered with Epon 815 resin containing 16 pph of Thornel 50 discontinuous graphite fibers and 11 pph of DTA. The coatings of the sensors are allowed to cure at room temperature for 20 hours. At the end of this period, the sensors are adhesively bonded at an elevated temperature to a re-entry space vehicle. As a result of thermally induced compressive forces, the first sensor is rendered inoperative. However, the bonding operation has no adverse effect upon the second sensor that is encapsulated with the composition of this invention.

As disclosed in the literature, fillers are used extensively to modify epoxy resin so as to obtain products having desired properties. Modification of epoxy potting compounds to reduce their coefficient of linear thermal expansion ($\alpha$) has been accomplished by compounding the resins with fillers such as aluminum oxide, calcium carbonate, silica, lithium aluminosilicate, iron powder, aluminum powder and copper powder. In FIG. 1 of the drawing, curves are shown that illustrate the reduction of $\alpha$ versus the amount of a particular filler. The curves have been taken from the "Handbook of Epoxy Resins" by Lee and Neville, McGraw-Hill, Inc. From a consideration of the curves, it is seen that very large quantities of filler are required to obtain significant reductions in $\alpha$. FIG. 2 of the drawing shows curves that have been plotted from the data recorded in Table II. As seen from these curves, only a comparatively small amount of the chopped fibers are required in order to obtain a reduction in $\alpha$ that is much greater than that obtained with fillers disclosed in the prior art.

As will be evident to those skilled in the art, modification of the invention can be made in view of the foregoing disclosure without departing from the spirit and scope of the invention.

I claim:

1. A method of encapsulating structurally delicate electrical, optical and mechanical components which comprises covering portions of the components with a composition with a low coefficient of thermal expansion consisting essentially of a pourable, homogeneous mixture of an epoxy resin, discontinuous fibers having a length in the range of 1 to 10 mils, the fibers being selected from the group consisting of graphite fibers, boron nitride fibers and mixtures thereof, the amount of discontinuous fibers being in the range of 10 to 16 parts by weight per 100 parts by weight of epoxy resin, and a curing agent for the epoxy resin; and curing the composition so as to form a solid epoxy resin covering the portions of the components.

2. The method according to claim 1 in which the epoxy resin is the condensation product of a polyhydric phenol and a polyfunctional halohydrin.

3. The method according to claim 2 in which the epoxy resin has the following structural formula:
wherein $n$ has a value of 0–4 such that the resin is pourable at room temperature.

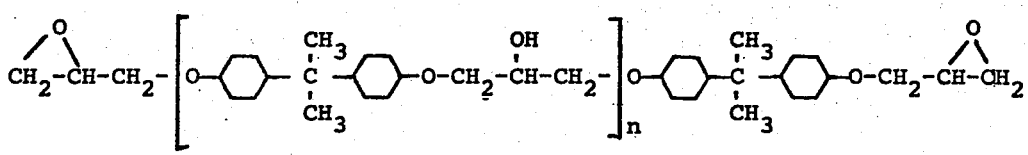

4. The method according to claim 1 in which the amount of curing agent in the mixture is in the range of about 5 to 15 parts by weight per 100 parts by weight of epoxy resin.

5. The method according to claim 4 in which the curing agent is selected from the group consisting of aromatic and aliphatic primary, secondary and tertiary amines, and anhydrides of carboxylic acids.

6. The method according to claim 1 in which the composition is cured by maintaining the composition at room temperature for a period of about 18 to 48 hours.

* * * * *